United States Patent [19]

Cuff

[11] 4,184,832
[45] Jan. 22, 1980

[54] DIE CONSTRUCTION

[75] Inventor: David W. Cuff, Chepachet, R.I.

[73] Assignee: Leesona Corporation, Warwick, R.I.

[21] Appl. No.: 921,823

[22] Filed: Jul. 3, 1978

Related U.S. Application Data

[60] Division of Ser. No. 727,155, Sep. 27, 1976, Pat. No. 4,112,039, which is a continuation-in-part of Ser. No. 549,375, Feb. 12, 1975, Pat. No. 3,981,959, which is a continuation-in-part of Ser. No. 414,699, Feb. 10, 1974, abandoned, which is a division of Ser. No. 287,276, Sep. 8, 1972, Pat. No. 3,792,950.

[51] Int. Cl.$^2$ .............................. B29F 3/04; B29F 3/08
[52] U.S. Cl. .................... 425/308; 425/376 R; 425/378 R; 425/378 S; 425/379 R; 425/379 S; 425/382 R; 425/464
[58] Field of Search ............ 425/376 R, 378 R, 378 S, 425/461, 464, 379 R, 379 S, 313, 308, 311, 382, 382.2, 463, 310

[56] References Cited

U.S. PATENT DOCUMENTS

| | | | |
|---|---|---|---|
| 721,462 | 2/1903 | Richards | 264/275 |
| 1,592,671 | 7/1926 | Nichols | 264/275 |
| 1,693,315 | 11/1928 | Penfold | 264/271 |
| 1,883,704 | 10/1932 | Goodwin | 264/271 |
| 2,127,487 | 8/1938 | Voit | 264/271 |
| 2,787,024 | 4/1957 | Smith | 264/275 |
| 3,069,727 | 12/1962 | Shramek | 425/379 |
| 3,177,280 | 4/1965 | Ford et al. | 264/275 |
| 3,188,370 | 6/1965 | Gotzy | 264/275 |
| 3,202,742 | 8/1965 | Bachelder et al. | 264/275 |
| 3,241,186 | 3/1966 | Coons | 425/378 |
| 3,437,725 | 4/1969 | Pierce | 264/176 F |
| 3,792,950 | 2/1974 | Cuff | 425/378 |
| 3,848,034 | 11/1974 | Schaefer | 264/263 |
| 3,981,959 | 9/1976 | Cuff | 264/237 |

FOREIGN PATENT DOCUMENTS 972182 10/1964 United Kingdom ................ 425/378 S Primary Examiner—W. E. Hoag
Attorney, Agent, or Firm—Robert J. Doherty

[57] ABSTRACT

An extrusion pelleting apparatus is disclosed wherein the outermost portion of an extrusion orifice is surrounded by a heat reservoir maintained at a temperature significantly higher than the softening temperature range of the polymer being extruded. The high temperature heat reservoir constitutes a heat source from which individual extrusion orifices may be heated above the polymer's softening range to assist in melting frozen plugs of polymer which may block the orifice from time to time.

Also disclosed is a heat flow control mechanism, in effect, for slowing the heat release from the reservoir to the individual extrusion orifices for economy of operation while still making available such high temperature source for unfreezing such plugs.

6 Claims, 3 Drawing Figures

DIE CONSTRUCTION

BACKGROUND OF THE INVENTION

This is a division of application Ser. No. 727,155, filed Sept. 27, 1976, and now U.S. Pat. No. 4,112,039 which in turn is a continuation in part of application Ser. No. 549,375 filed Feb. 12, 1975 now U.S. Pat. No. 3,981,959 in turn a continuation in part of application Ser. No. 414,699 filed Feb. 10, 1974 now abandoned which in turn is a division of application Ser. No. 287,276 filed Sept. 8, 1972 and now U.S. Pat. No. 3,792,950. As such, this application discloses a significant improvement in the means and manner of accomplishing the unblocking of those extrusion passages as may occur in the devices disclosed therein. In such regard, the disclosures in the above referred to applications are herein incorporated by specific reference into the present disclosure and accordingly form a part thereof.

In such previous applications, a system which permits drastically increased pelleting operation efficiencies by means of the introduction of liquid coolant under pressure into direct contact with the outer surface of the polymeric material passing through its containing die orifice, vaporizing a part of said coolant immediately upon entrance thereof to said orifice to form at least a solidified outer wall of the material surrounding an inner core thereof, while simultaneously lubricating the wall of the orifice by non-vaporized coolant to facilitate the passage of the material therethrough is disclosed.

Upon emergence of such partially solidified material at the die exit, in rod or strand-like form, such may be cut by rotating knives without the need of additional cooling to produce individual pellets at a higher operational speed with significant reduction of smearing or the tendency of pellets to string together in the form of clumps. While such apparatus and the method of accomplishing such pelletizing represents significant advance over the prior art by reason of it highly efficient heat transfer mechanisms, such does on occasion produce freeze-ups, that it, slugs of solidified polymer which block individual orifices or bores of the many such orifices utilized in production type equipment. Once such a freeze-up has occurred in an individual extrusion bore, the coolant medium in the form of partially vaporized liquid coolant is blocked in the extrusion passage behind such blockage and eventually it is possible by reason of its softening effect upon the frozen plug will melt or soften the plug to an extent to enable resumption of polymer extrusion within such orifice. The present invention is directed to a method and apparatus for reducing the frequency of such freeze-ups and for providing a more efficient and assured manner of extrusion resumption after such freeze-offs take place.

Accordingly a primary object of the present invention is to provide means for melting solidified polymer plugs which have frozen in an individual extrusion bore of a pelletizing apparatus of the aforementioned type which utilizes a combination coolant and lubricating medium of pressurized liquid coolant.

Another object of the present invention is the provision of an apparatus and method for more effectively resuming extrusion within extrusion orifices wherein a frozen polymer plug has formed therein in a pelletizing process of the immediately aforementioned type in which a heat source at a significantly higher temperature than the melting temperature range of the polymer being extruded is provided about the exit portion of such extrusion passages and is accordingly available to soften, melt, and initiate start-up once freeze-offs occur in any individual extrusion passage, but which by reason of the presence of a continual flow of high efficiency coolant about the outer surface of the polymer during normal operation which serves to remove heat from both the polymer and the heat source, the higher temperature at such heat source is not available during normal operation to adversely raise the polymer temperature.

A still further object of the invention is the provision of a separate ring, in circular die geometry, spaced closely to the outside or exit surface of the die and maintained at a significantly higher temperature than that of the melting or softening temperature range of the polymer being extruded in such a manner, that a continual exchange from such elevated heat source is maintained about said extrusion orifices so that polymer strands that become frozen or plugged can be more readily softened and extrusion resumed.

A still further object of the present invention is to provide improved means by which the amount of heat passing from such aforementioned high temperature heat source may be efficiently controlled during both operating and freeze-off conditions in the pelletizing methods and apparatus of the aforementioned type.

These and other objects of the present invention are accomplished by the provision of novel extrusion apparatus and method comprising heating thermoplastic material to make it fluid, conveying said material into the initial zone of an extrusion die having at least one extrusion orifice, forcing said material through said orifice and outward from said die in rod or strand-like form having at least a solidified outer wall structure surrounding an inner core of said material, directing a liquid coolant under pressure into an intermediate zone of said extrusion orifice downstream from said initial zone to contact the outer surface of said material passing therethrough while at least partially vaporizing said coolant to simultaneously form said solidified outer wall structure and to provide a lubricating film between the inner wall of said orifice and said material to facilitate passage of said material therethrough, and providing a heat reservoir in that portion of said die surrounding a final zone of said extrusion orifice downstream of said intermediate zone at a significantly higher temperature than the softening temperature range of said material being extruded therethrough.

Other object, features, and advantages of the invention will become apparent when the description thereof proceeds when considered in connection to accompanying illustrative drawing.

DESCRIPTION OF THE DRAWING

In the drawing which illustrates the best modes presently contemplated for carrying out the present invention.

DESCRIPTION OF THE INVENTION

Figure 1:
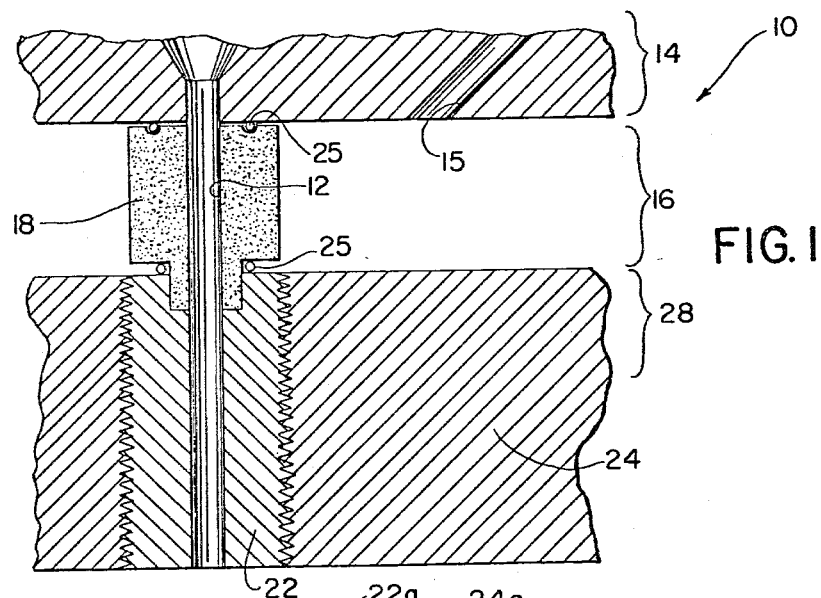
FIG. 1 is a cross sectional view in stylized form of a die extrusion head similar to those disclosed in the above referred to patent applications showing the high temperature heat source of the present invention in the form of a separately heated ring positioned downstream of the normal exit end of such die construction.

Turning now to the drawing and in particular FIG. 1 thereof, an extrusion die 10 representative of those described in the aforementioned applications of which the present application is a continuation in part thereof is depicted. Such die 10 is generally of ring-like configuration and includes a plurality of extrusion orifices 12 adapted for operative engagement generally with an extruder as is know in the art. The die includes an initial zone for feeding a thermoplastic resinous material such as polypropylene, polyethylene, or the like in a heated fluid condition and forcing such material through the plurality of such extrusion orifices 12. Such zone is bracketed and indicated by the reference numeral 14 in FIG. 1 of the drawing. Thereafter, the material passes through an intermediate zone 16 wherein coolant under pressure i.e., water is introduced as through opening 15 into direct contact with the outer surface of the resinous material filling the extrusion orifice 12 as through body 18 preferably of open porous metal construction as depicted. As soon as the coolant comes in contact with the material, by reason of an accompanying pressure reduction, a part of the coolant is immediately vaporized and accordingly quickly by heat of vaporization and temperature reduction transfer, removes an extensive amount of heat from the material contained therein. Although the system is hydraulically open, that is, the extrusion orifice 12 exits at the die face 20 of the die 10 in an unrestrained manner, a portion of the liquid coolant is maintained in liquid state as it passes along the extrusion orifice 12 to the exit face 20 thereof inasmuch as a pressure gradient is set up within the extrusion bore 12 from the high pressure end at the initial zone 14 thereof to the ambient or low pressure end at the exit end 20 thereof establishes cooling gradients at surfaces of the polymer strand and orifice wall and in turn cooling to take place thereat. Such higher than ambient pressures within the extrusion orifice 12 permits such liquid phase to be present even though temperatures considerably higher than would permit liquid phase presence at normal atmospheric pressures are maintained in the orifice 12. It is thus believed that a combination of vapor, that is, vaporized water and liquid phase water are present between the outside surface of the material being extruded and the inside surface of the orifice 12 in such a manner so as to form an effective combination coolant and lubrication film or medium as the material passes therethrough. The above explanation is believed to be that which takes place within the extrusion orifice 12 although other explanations consistent with the effective passage of the material therethrough and the formation of a solidified and cooled skin surrounding an inner core of material as the material in rod or strand-like form emerges from the die face 20 may exist.

The porous member 18 may be secured to the die 10 by means of an insert 22 threadably or otherwise positioned within an outer section 24 of the die body. Appropriate seals 25 may be provided therebetween as is known. The portion of the die downstream from the die body portion 24, provides a final extrusion zone 28 downstream of the aforementioned intermediate zone in which the material is contained in the form of rod or strand-like configurations having an outer solidified surface during its passage through the die. Upon emergence from the die face 20, a cutter is positioned to cut the rod or strand-like material into discrete separate pellets.

Figure 2:
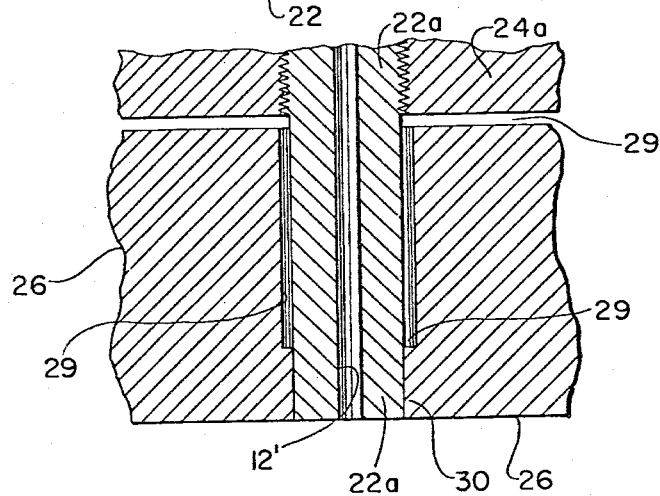
FIG. 2 is a partial sectional view on an enlarged scale showing a modified relationship between such other high temperature ring and die extrusion bores reducing the energy consumption therebetween.

With such systems one or more of the extrusion orifices 12 by reason of the strong cooling action provided by the depressurized coolant and particularly by reason of the induced ebullition (heat of vaporization effect) upon the aforementioned surface of such material and for other reasons may become blocked or plugged with chilled solidified masses of material so that strand emergence from such extrusion orifice or orifices is temporarily blocked. While the plugging of one or even several of such extrusion orifices 12 in a die body having many such orifices is not a particularly serious problem, there does become a point where the efficiency of the operation is hindered. It would, of course, be desirable to pinpoint such plugs and direct heat specifically thereto to melt the same; however, such is not practical due to the great number of orifices generally utilized, at least with the present state of the art. Also a general maintenance of a heat source surrounding the orifices at a substantially higher temperature is known to adversely affect strand control in hitherto known extrusion systems. However, apparently the amount and manner of the coolant system provided for in the aforementioned process of which this invention represents an improvement thereover, permits a transfer of heat from the adjacent orifice surfaces without adversely affecting the condition and hence control over the emerging strand. Accordingly a prime feature of the present invention is the maintenance of areas surrounding the orifices at a temperature substantially higher than the melting temperature range of the polymer passing therethrough; however, the effects of this higher temperature are not transferred to the polymer necessarily in terms of added heat to adversely raise its temperature since the highly effective coolant system removes not only heat from the polymer itself to cool such and form at least a cooled exterior shell thereon but further serves to remove the heat transferred to the orifice by the surrounding heat source. The above steady state conditions are present so long as the polymer continues its flow through the particular orifice under consideration and in the particular manner above described and the coolant flow between such polymer and the interior surfaces of such orifice is maintained. However, when the polymer flow ceases as by the formation of a freeze-off, the thermal reserve brought about by the proximity of the high temperature heat source is immediately available for melting said frozen polymer. In order not to deplete the heat reservoir during normal steady-state operation, however, it has been found useful to reduce or limit the rate at which heat is transferred from the area to the outer surface of the orifice walls, it has also been found useful to reduce the rate at which the heat from the area i.e., the heat reservoir surrounding the orifices is available to the outer surface of the orifice walls and accordingly in turn available to the strand or rod-like form of material as it either passes through the orifice 12 or is stationary therein as when freeze-offs occur. Referring now to FIG. 2, an insert 22a surrounding an orifice 12 is positioned against or partially within that surface 24a which formally was the outer surface of the die 10 so as to project outwardly therefrom. In juxtaposition with such platen surface 24a is an outer platen or heat reservoir 26 positioned as by stop means or other conventional means which may be provided about the periphery thereof, so as to be spaced apart from the outer surface of the platen 24a thereby providing an air gap 29 therebetween. Such air gap 29 not only extends along the front face of the platen 24a but also surrounds the inserts 22a for a major extent thereof and in such a way reduces the rate at which the heat from the high temperature heat source or reservoir platen 26 is available to the material extrusion orifice 12 by at least partially insulating such therefrom. However, the continual radiation exchange of heat between the heat sink 26 across the insulative air gap 29 into contact with a major extent of the insert 22, although at a slower rate than would take place with conductive transfer allows the frozen polymer plug to be melted and extrusion started again. The provision of such a high temperature heat sink further enables preheating of the extrusion orifices to a higher temperature than hitherto available during the start-up of the extrusion apparatus.

It should be noted that separate heating means (not shown) are maintained within the heat reservoir platen 26 so as to enable its temperature to be maintained separately and at a substantially higher temperature than that of the remainder of the die 10. The heated platen 26 as shown in FIG. 2 may also be provided with a boss 30 in physical contact and conductive heating relationship to the sleeve 22a so as to provide an increased rate of heat passage in those cases where such is necessary and preferably proximal to the exit face 20 of the die inasmuch as such area tends to be exposed to more variations in ambient temperatures and as such could cause greater strand variation to the polymer passing therethrough. Such boss 30 by reason of its minor extent in relationship to the overall extent of the extrusion orifice 12 within the fibal zone 28 minimizes the extent of efficient heat coupling between the die components and accordingly reduces the heat exchange from the platen 26 to the extrusion sleeve 12 and in turn minimizes the increased load in which combination lubrication and coolant film present in the subject system is required to absorb without materially reducing its lubrication and cooling effects upon the material being extruded.

Figure 3:
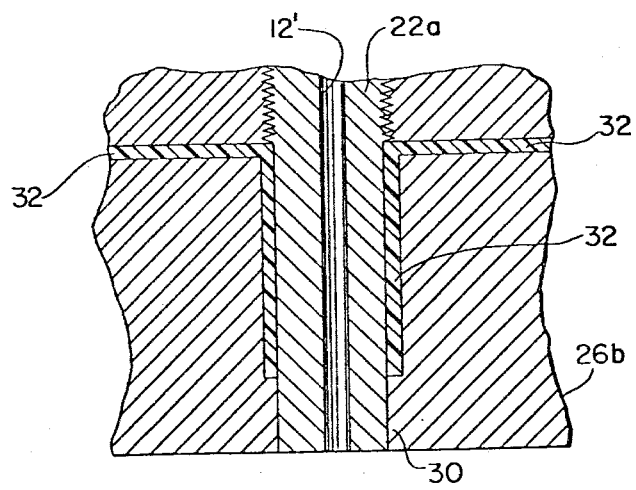
FIG. 3 is a cross sectional view similar to FIG. 2 showing a modified construction accomplishing heat conservation in the present invention.

Turning now to FIG. 3 of the drawing, a similar heat platen 26b is depicted. Such platen 26b is spaced from the insert 22a by means of a ceramic insert 32 which as depicted, may be of two piece construction, that is, a planar portion adapted to fit against the platen 24a and a series of cylindrical extensions adapted to surround the inserts 22a. In such alternative embodiment, platen 26b may also be provided with an inwardly extending boss 30 to provide a portion of conductive and more efficient heat transfer between the heat source and the material being extruded; the common feature between both embodiments being the insulative feature which reduces the rate of heat transfer in order to conserve energy requirements.

The following is an example of the above-illustrative and described improved extrusion process wherein polypropylene having a melt flow index of 5 and with the midpoint of its workable melting temperature range about 450° F. was extruded at a rate of approximately 2,500 lbs./hr. through a two-stage 400 H.P. extruder available from Johnson Plastics Machinery Co., Chippewa Falls, Wisconsin, coupled to a die face cutter as described in the previously referred to patent applications. The outer platen i.e., the heat reservoir was maintained at temperatures varying from 500° F. to 600° F. Water coolant was introduced under high pressure via open cell sintered metal inserts surrounding each orifice as taught by the previously referred to applications at a rate wherein the rods of polymer emerging from the die face exhibited an outer hardened cooled polymer shell which when cut produced individual pellets without evidence of smearing.

The equipment and process utilized as above related to polypropylene was conducted with commercially available ABS polymer having an approximate midpoint melting temperature range wordable for extrusion of 425° F. at the same rates as above indicated but wherein the outer platen or heat reservoir was maintained at a temperature of approximately 555° F. Again polymer rods exhibiting a cooled outer shell which when cut produced discrete pellets without evidence of smearing were produced.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A plural orifice extrusion die comprising: an apertured plate for operative engagement with an extruder, a second plate having a plurality of insert members positioned herein and passing therethrough and each extending from a side of said second plate opposite said apertured plate, porous members each having an orifice therethrough in sealed relationship with both said apertured plate and one of said insert members, means to conduct liquid coolant to exteriors of said porous members, each of said insert members having a through orifice, and a heater plate forming a heat reservoir in contact with each of said insert members adjacent an exit end of an extending portion thereof and said heater plate also surrounding said insert members and being spaced therefrom and also spaced from said second plate to insulate said insert members from said heater plate except where said heater plate contacts said insert members.

2. The apparatus as set forth in claim 1, including cutting means movably mounted adjacent an exit face of said die for severing extruded said material into discrete separate pellets as such emerges from said exit face.

3. The apparatus as set forth in claim 1, including means positioned intermediate said orifice and said heat reservoir for reducing the rate of heat flow therebetween.

4. The apparatus as set forth in claim 3, wherein said heat rate reducing means comprises insulating means.

5. The apparatus as set forth in claim 3, wherein heat flow rate reducing means comprises an air gap.

6. The apparatus as set forth in claim 4, wherein said insulating means comprises a ceramic insert.

* * * * *